US011217796B2

United States Patent
Horiai et al.

(10) Patent No.: US 11,217,796 B2
(45) Date of Patent: Jan. 4, 2022

(54) ELECTRODE CATALYST FOR FUEL CELL AND METHOD OF PRODUCTION OF SAME

(71) Applicants: CATALER CORPORATION, Kakegawa (JP); TOYOTA JIDOSHA KABUSHIKI KAISHA, Toyota (JP)

(72) Inventors: Kotaro Horiai, Kakegawa (JP); Mikihiro Kataoka, Kakegawa (JP); Tomoaki Terada, Kakegawa (JP); Mikihiro Hori, Nagoya (JP); Yuusuke Itou, Nagoya (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 15/955,293

(22) Filed: Apr. 17, 2018

(65) Prior Publication Data

US 2018/0316024 A1 Nov. 1, 2018

(30) Foreign Application Priority Data

Apr. 28, 2017 (JP) .............................. JP2017-090309

(51) Int. Cl.
| | |
|---|---|
| *H01M 4/00* | (2006.01) |
| *H01M 4/92* | (2006.01) |
| *H01M 4/88* | (2006.01) |

(52) U.S. Cl.
CPC ............. *H01M 4/926* (2013.01); *H01M 4/88* (2013.01); *Y02E 60/50* (2013.01)

(58) Field of Classification Search
CPC .......... H01M 4/926; H01M 4/88; Y02E 60/50
See application file for complete search history.

(56) References Cited

U.S. PATENT DOCUMENTS

| | | | |
|---|---|---|---|
| 5,876,867 A | 3/1999 | Itoh et al. | |
| 6,686,308 B2 * | 2/2004 | Mao ..................... | B01J 37/0211 502/180 |
| 2005/0070427 A1 | 3/2005 | Pak | |

(Continued)

FOREIGN PATENT DOCUMENTS

| | | |
|---|---|---|
| CN | 105142779 A | 12/2015 |
| JP | H08-162133 A | 6/1996 |

(Continued)

OTHER PUBLICATIONS

English machine translation of JP,2014-002981,A (Year: 2014).*
Apr. 16, 2019 Office Action issued in Japanese Patent Application No. 2017-090309.

*Primary Examiner* — Nicholas P D'Aniello
(74) *Attorney, Agent, or Firm* — Oliff PLC

(57) ABSTRACT

An electrode catalyst and a method for producing the electrode catalyst are described, in which the electrode catalyst includes catalyst metal particles containing platinum or a platinum alloy, and carrier particles supporting the catalyst metal particles. The carrier particles are made of a carbonaceous material with a BET specific surface area of 700 m$^2$/g or more. The catalyst metal particles have an average particle size of 2.5 to 4.5 nm, and a standard deviation of the particle size of the catalyst metal particles is 1.30 nm or less. The electrode catalyst has a high initial activity and is able to maintain that activity over a long period of time.

4 Claims, 1 Drawing Sheet

(56) References Cited

U.S. PATENT DOCUMENTS

| | | |
|---|---|---|
| 2005/0238936 A1 | 10/2005 | Cho |
| 2009/0029216 A1 | 1/2009 | Yamamoto |
| 2013/0244137 A1 | 9/2013 | Tada et al. |
| 2015/0352522 A1 | 12/2015 | Mizuuchi et al. |
| 2016/0072134 A1* | 3/2016 | Ohma ............... H01M 4/885 429/524 |
| 2016/0372759 A1 | 12/2016 | Ueyama et al. |
| 2017/0338495 A1 | 11/2017 | Horiuchi et al. |

FOREIGN PATENT DOCUMENTS

| | | |
|---|---|---|
| JP | H10-69914 A | 3/1998 |
| JP | 2003-142112 A | 5/2003 |
| JP | 2005-108838 A | 4/2005 |
| JP | 2005-166409 A | 6/2005 |
| JP | 2005-294175 A | 10/2005 |
| JP | 2005-317546 A | 11/2005 |
| JP | 2007-123195 A | 5/2007 |
| JP | 2008-049336 A | 3/2008 |
| JP | 2009-500789 A | 1/2009 |
| JP | 2009-140657 A | 6/2009 |
| JP | 2010-27364 A | 2/2010 |
| JP | 2011-149042 A | 8/2011 |
| JP | 2011-240245 A | 12/2011 |
| JP | 2012-124001 A | 6/2012 |
| JP | 2012-236138 A | 12/2012 |
| JP | 2012-248365 A | 12/2012 |
| JP | 2013-252483 A | 12/2013 |
| JP | 2014-2981 A | 1/2014 |
| JP | 2014-93255 A | 5/2014 |
| JP | 2014-221448 A | 11/2014 |
| JP | 2017-6809 A | 1/2017 |
| WO | 2006/088194 A1 | 8/2006 |
| WO | 2007/005081 A2 | 1/2007 |
| WO | 2014129597 A1 | 8/2014 |
| WO | 2016/063968 A1 | 4/2016 |

* cited by examiner

1

ELECTRODE CATALYST FOR FUEL CELL AND METHOD OF PRODUCTION OF SAME

TECHNICAL FIELD

The present invention relates to an electrode catalyst for fuel cell and a method of producing the same.

BACKGROUND ART

A fuel cell is high in power generation efficiency, easy to reduce in size, and has little detrimental effect on the environment, so is promising for use in various fields such as PCs, mobile phones and other mobile devices, automobiles, trains, and other vehicles.

A fuel cell is composed of a pair of electrodes and an electrolyte. The electrode includes an electrode catalyst composed of catalyst metal particles and a carrier supporting the same. In general, as a carrier for fuel cell in the past, carbon has been used. Further, as the catalyst metal particles, platinum or a platinum alloy has been used.

A fuel cell with a high initial activity of the electrode catalyst and able to maintain that activity over a long period of time has been sought. Numerous arts have been reported for that purpose (Patent Documents 1 to 8).

PRIOR ART DOCUMENTS

Patent Documents

Patent Document 1: JP2012-124001A
Patent Document 2: JP2013-252483A
Patent Document 3: JP2012-248365A
Patent Document 4: JP2012-236138A
Patent Document 5: JP2005-317546A
Patent Document 6: JP2005-166409A
Patent Document 7: JP2009-140657A
Patent Document 8: WO2016/063968A
Patent Document 9: WO2014/129597A

SUMMARY OF THE INVENTION

Problems to be Solved by the Invention

The object of the present invention is to provide an electrode catalyst for fuel cell with a high initial activity of the electrode catalyst and able to maintain that activity over a long period of time and a method of producing the same.

Means for Solving the Problems

The inventors discovered that the above problem can be solved by the present invention having the following aspects.

Aspect 1
An electrode catalyst for fuel cell, comprising catalyst metal particles containing platinum or a platinum alloy, and carrier particles supporting the catalyst metal particles,
wherein the carrier particles are made of a carbonaceous material with a BET specific surface area of 700 $m^2/g$ or more,
wherein the catalyst metal particles have an average particle size of 2.5 to 4.5 nm, and
wherein a standard deviation of the particle size of the catalyst metal particles is 1.30 nm or less.

Aspect 2
The electrode catalyst for fuel cell according to the Aspect 1 wherein the carrier particles are made of a carbonaceous material with a BET specific surface area of 900 to 1500 $m^2/g$.

Aspect 3
The electrode catalyst for fuel cell according to the Aspect 1 or 2 wherein the catalyst metal particles have an average particle size of 2.8 to 3.8 nm and the standard deviation of the particle size of the catalyst metal particles is 0.95 to 1.15 nm.

Aspect 4
The electrode catalyst for fuel cell according to any one of the Aspects 1 to 3 wherein the catalyst metal particles contain an alloy of platinum and cobalt with a molar ratio of 4:1 to 11:1.

Aspect 5
A fuel cell containing an electrode catalyst according to any one of the Aspects 1 to 4.

Aspect 6
A production method of an electrode catalyst for fuel cell according to any one of the Aspects 1 to 4, comprising
heat treating the carrier particles supporting the metal forming the catalyst metal particles at a temperature of 830° C. or more for 0.2 hour to 2 hours.

Aspect 7
The production method according to the Aspect 6 wherein the heat treatment is performed at a temperature of 880 to 980° C. for within 1.5 hours.

Aspect 8
The production method according to the Aspect 6 or 7 wherein a highest temperature of the heat treatment is 1000° C. or less.

DETAILED DESCRIPTION OF THE INVENTION

Electrode Catalyst for Fuel Cell

Figure 1:
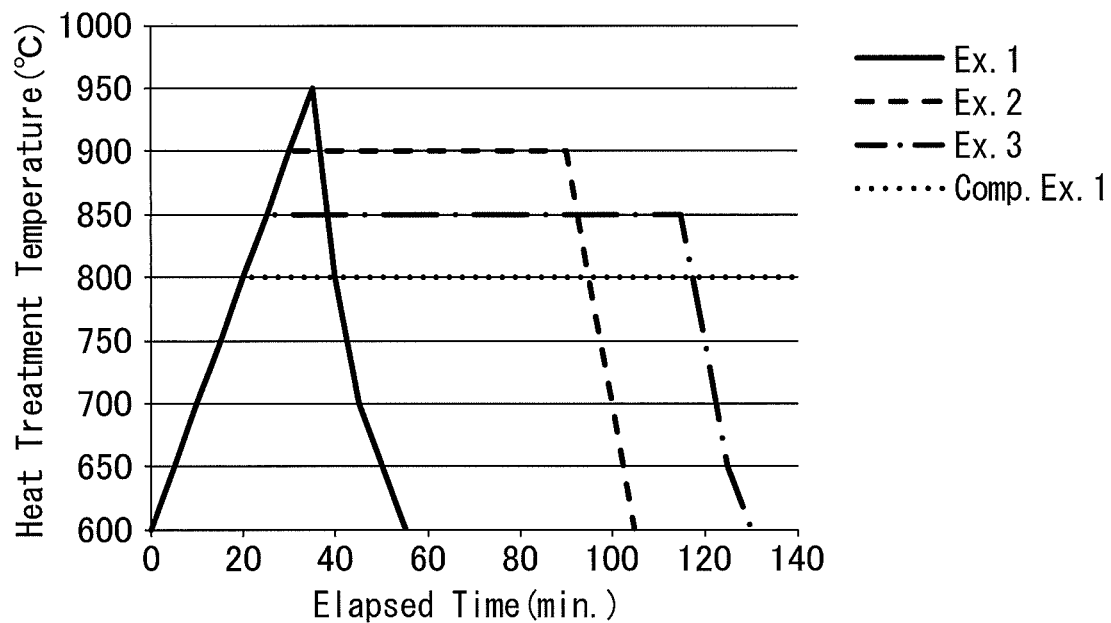
FIG. 1 shows a temperature profile of heat treatment for the examples performed in the embodiments.

The electrode catalyst for fuel cell of the present invention comprises catalyst metal particles containing platinum or a platinum alloy and carrier particles supporting the catalyst metal particles. The carrier particles are made of a carbonaceous material with a specific surface area of 700 $m^2/g$ or more, the catalyst metal particles have an average particle size of 2.5 to 4.5 nm, and the standard deviation of the particle size of the catalyst metal particles is 1.30 nm or less.

In the prior art, if trying to obtain catalyst metal particles with an average particle size of 2.5 to 4.5 nm, the distribution of particle size tended to become poor in uniformity. Further, if trying to improve the uniformity of the distribution of particle size, the average particle size tended to become too small. As opposed to this, the inventors discovered that if using a carbonaceous material with a high specific surface area for the carrier particles and producing them under specific heat treatment conditions, the obtained catalyst metal particles would be given a distribution of particle size which could not be obtained in the prior art (that is, a combination of average particle size and standard deviation). If the average particle size of the catalyst metal particles is small, the initial activity of the electrode catalyst becomes higher, but the activity tends to be unable to be maintained for a long period of time. However, it was found that in the electrode catalyst of the present invention, the activity can be maintained for a long period of time even if the average particle size is small.

Catalyst Metal Particles

The catalyst metal particles used in the present invention are particles which contain platinum or a platinum alloy, preferably are particles of platinum or a platinum alloy, particularly preferably are particles of a platinum alloy. The average particle size of the catalyst metal particles is 2.5 to 4.5 nm, while the standard deviation of the particle size of the catalyst metal particles is 1.30 nm or less.

The average particle size of the catalyst metal particles may be 2.6 nm or more, 2.8 nm or more, 3.0 nm or more, 3.2 nm or more, or 3.4 nm or more and may be 4.5 nm or less, 4.2 nm or less, 4.0 nm or less, 3.8 nm or less, or 3.6 nm or less. Further, the standard deviation of the particle size of the catalyst metal particles may be 1.25 nm or less, 1.20 nm or less, 1.15 nm or less, 1.10 nm or less, or 1.05 nm or less and may be 0.10 nm or more, 0.30 nm or more, 0.50 nm or more, 0.80 nm or more, 0.90 nm or more, or 0.95 nm or more. If the particle size of the catalyst metal particles is in such ranges, the initial activity of the electrode catalyst is high and the activity tends to be able to be maintained for a long period of time.

The average particle size of the catalyst metal particles is calculated from the measurement peak of X-ray diffraction using the analytical software JADE. In this case, the average particle size becomes the average particle size of the number average. The standard deviation of the particle size of the catalyst metal particles can be calculated by the X-ray small angle scattering method using analytical software. As the analytical software, for example, Nano-Solver (made by Rigaku) etc. may be mentioned.

If the catalyst metal particles contain a platinum alloy, the type of the platinum alloy is not particularly limited so long as it functions as an electrode catalyst for fuel cell. For example, the platinum alloy may be an alloy of a metal selected from the group of iron, chrome, nickel, cobalt, terbium, yttrium, gadolinium, and ruthenium and combinations of the same and of platinum, preferably is an alloy of a metal selected from the group of nickel, cobalt, terbium, yttrium, gadolinium, and ruthenium and combinations of the same and of platinum, particularly preferably is an alloy of platinum and cobalt.

The molar ratio of platinum and the metal forming the platinum alloy may be 1 or more:1, 2 or more:1, 4 or more:1, 5 or more:1, or 10 or more:1 and may be 100 or less:1, 50 or less:1, 30 or less:1, 20 or less:1, or 10 or less:1. For example, the molar ratio of the alloy of platinum and cobalt may be 4:1 to 11:1.

The content of the catalyst metal particles in the electrode catalyst for fuel cell of the present invention may be 10 wt % or more, 20 wt % or more, 30 wt % or more, 35 wt % or more, 40 wt % or more, or 45 wt % or more or may be 70 wt % or less, 60 wt % or less, 55 wt % or less, 50 wt % or less, 45 wt % or less, 40 wt % or less, or 35 wt % or less based on the total weight of the carrier particles and catalyst metal particles.

Carrier Particles

The carrier particles used in the present invention are made of a carbonaceous material with a BET specific surface area of 700 $m^2/g$ or more. The BET specific surface area of the carbonaceous material may be 750 $m^2/g$ or more, 800 $m^2/g$ or more, 850 $m^2/g$ or more, 900 $m^2/g$ or more, or 950 $m^2/g$ or more and may be 2500 $m^2/g$ or less, 2000 $m^2/g$ or less, 1800 $m^2/g$ or less, 1500 $m^2/g$ or less, or 1200 $m^2/g$ or less. It was found that if in such ranges, the particle size of the obtained platinum alloy become extremely uniform and suitable in size.

The type of the carbonaceous material is not particularly limited so long as the BET specific surface area is high, but for example graphite, activated carbon, carbon black, carbon nanotubes, solid carbon, hollow carbon, dendritic carbon, and combinations of the same may be mentioned. As the solid carbon and hollow carbon, carbon such as described in Patent Document 8 may be mentioned. As the dendritic carbon, carbon such as described in Patent Document 9 may be mentioned.

The average particle size of the carrier particles may be preferably 30 μm or less, 20 μm or less, or 10 μm or less or may be 0.1 μm or more, 0.5 μm or more, 1.0 μm or more, 5.0 μm or more, or 10 μm or more. In this case, the average particle size can be calculated from the number average equivalent diameter based on a large number of photographs taken at any positions by an electron microscope. Note that the "equivalent diameter" means the diameter of a true circle having an outer peripheral length equal to the outer peripheral length of that particle.

Fuel Cell

The fuel cell of the present invention includes the above mentioned electrode catalyst. This fuel cell may include electrodes containing the above electrode catalyst and ionomer on a base material and an electrolyte, in particular a polymer electrolyte.

As the type of ionomer, for example, Du Pont's Nafion® DE2020, DE2021, DE520, DE521, DE1020, and DE1021 and Asahi Kasei Chemicals' Aciplex® SS700C/20, SS900/10, SS1100/5, etc. may be mentioned.

As the type of fuel cell, a solid polymer type fuel cell (PEFC), phosphoric acid type fuel cell (PAFC), molten carbonate type fuel cell (MCFC), solid oxide type fuel cell (SOFC), alkali electrolyte type fuel cell (AFC), direct type fuel cell (DFC), etc. may be mentioned. While not particularly limited, the fuel cell is preferably a solid polymer type fuel cell.

Electrodes including the above electrode catalyst may be used as the cathode, may be used as the anode, or may be used as both the cathode and anode.

The fuel cell may further contain separators. Unit cells of a membrane electrode assembly (MEA) comprising a pair of electrodes (cathode and anode) and an electrolyte membrane sandwiched by a pair of separators can be stacked to form a cell stack and thereby obtain a high electric power. The fuel cell may further have gas diffusion layers etc.

Figure 2:
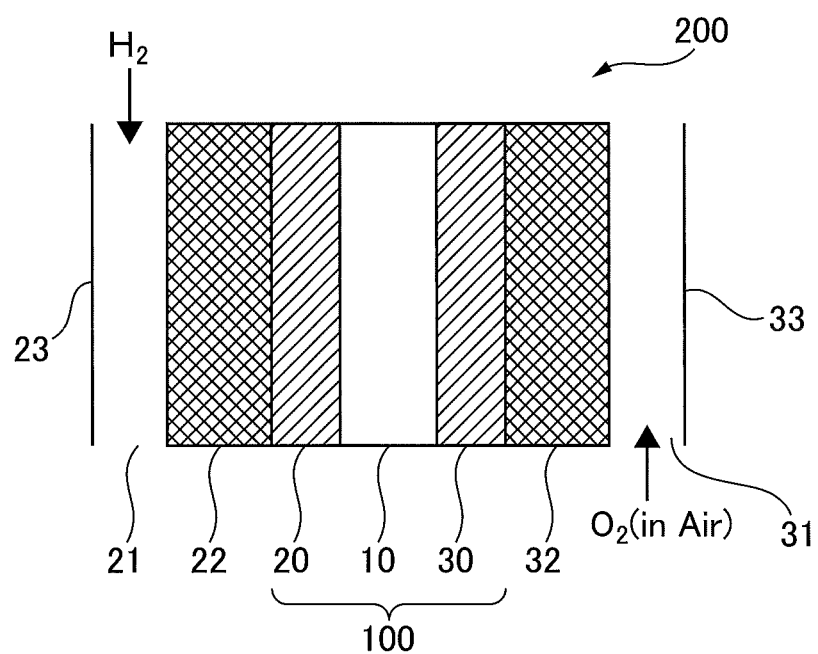
FIG. 2 shows an embodiment of a fuel cell.

FIG. 2 shows a membrane electrode assembly (100) having an anode electrode layer (20) and a cathode electrode layer (30) which contain the above electrode, and an electrolyte membrane (10) having a proton conductivity sandwiched by the electrode layers. Further, FIG. 2 shows a fuel cell (200) having, as a single cell, the membrane electrode assembly (100), an anode-side gas channel (21), an anode-side gas diffusion layer (22), an anode-side separator (23), a cathode-side gas channel (31), a cathode-side gas diffusion layer (32), and a cathode-side separator (33).

Method of Production of Electrode Catalyst for Fuel Cell

The method of production of the electrode catalyst for fuel cell of the present invention comprises heat treatment of the carrier particles supporting the metal forming the catalyst metal particles at 830° C. or more in temperature for within 2 hours. The electrode catalyst for fuel cell obtained by the method of the present invention may be the above electrode catalyst for fuel cell. For the catalyst metal particles and carrier particles, ones explained in relation to the above electrode catalyst for fuel cell can be used.

In the prior art, for example, the heat treatment was performed at 700 to 800° C. for about 3 to 6 hours, but the inventors discovered that if using a carbonaceous material with a high specific surface area as carrier particles and heat treating them in a short time at a high temperature, the obtained catalyst metal particles are given a distribution of particle size which could not be obtained in the past (that is, combination of average particle size and standard deviation).

Supporting Step

The method of production of the electrode catalyst for fuel cell of the present invention may comprise a step of supporting catalyst metal particles at carrier particles. The step of supporting the catalyst metal particles at carrier particles may comprise bringing a platinate solution into contact with the carrier particles and using a reducing agent to reduce the platinate. As the palatinate solution, for example, a solution of diammine dinitro platinum nitric acid may be mentioned.

In the step of bringing a platinate solution into contact with the carrier particles, the carrier particles can be made to disperse in an aqueous solvent and be mixed with a platinate solution. In this case, the aqueous solution may be made acidic to suppress the formation of precipitates able to be formed at the time of mixing with the palatinate solution.

The reducing agent is not particularly limited, but an alcohol, for example, ethanol, can be used. In the reducing step, it is possible to add the reducing agent, then perform heat treatment. The conditions of the heat treatment differ depending on the type of the reducing agent, but for example when using ethanol as a reducing agent, it is possible to heat the particles at 60° C. to 90° C. in temperature for 1 hour to 3 hours or so.

After the reducing step, the platinum particles and carrier particles can be separated from the dispersion. For example, a filter can be used for separation to obtain platinum particles and carrier particles supporting the same. After separating the platinum particles and carrier particles supporting the same, they may be washed and/or dried.

When using a platinum alloy as the catalyst metal particles, the platinum particles and carrier particles supporting the same may be further dispersed in an aqueous solvent to bring them into contact with the salt solution of the metal forming the platinum alloy. For example, when the metal forming the platinum alloy is cobalt, as the salt solution, it is possible to use a cobalt nitrate solution. In this case, a reducing agent can be used to reduce the salt of the metal and alloy the metal forming the platinum alloy and platinum to a certain extent. After the reducing step, the platinum alloy particles and carrier particles can be separated from the dispersion. For example, a filter can be used for separation to obtain platinum alloy particles and carrier particles supporting the same. After separating the platinum alloy particles and carrier particles supporting the same, they may be washed and/or dried.

Heat Treatment Step

After supporting the catalyst metal particles at the carrier particles in this way, the catalyst metal particles and the carrier particles supporting the same are heat treated at a temperature of 830° C. or more for 0.2 hour to 2 hours. In the above way, this heat treatment is performed in a relatively short time and at a high temperature.

The heat treatment performed at 830° C. or more may be performed at a temperature of 850° C. or more, 880° C. or more, 900° C. or more, or 930° C. or more. The highest temperature may be 1100° C. or less, 1050° C. or less, 1000° C. or less, 980° C. or less, 950° C. or less, 930° C. or less, 900° C. or less, or 880° C. or less.

The time of the heat treatment performed at 830° C. or more may be within 2 hours, within 1.8 hours, within 1.5 hours, within 1.2 hours, within 1.0 hour, within 0.8 hour, or within 0.5 hour. In this heat treatment, the time of the heat treatment performed at 880° C. or more may be within 1.5 hours, within 1.2 hours, within 1.0 hours, within 0.8 hour, or within 0.5 hour, while the time of the heat treatment performed at 920° C. or more may be within 1.0 hour, within 0.8 hour, or within 0.5 hour. Further, these heat treatments may be performed for 0.2 hour or more, 0.3 hour or more, 0.5 hour or more, 0.8 hour or more, 1.0 hour or more, or 1.5 hours or more. It was found that if this heat treatment is performed for a long time, the distribution of particle size of the catalyst metal particles tends to become uneven.

The heat treatment performed at 830° C. or more may be for example performed at 830° C. to 880° C. in temperature for within 2 hours or within 1.8 hours, be performed at over 880° C. to 920° C. in temperature for within 1.5 hours or within 1.2 hours, or be performed at over 920° C. to 980° C. in temperature for within 0.8 hour or within 0.5 hour. For example, it may be performed at 880 to 980° C. in temperature for within 1.5 hour, within 1.0 hour, or within 0.5 hour.

The temperature elevation rate and cooling rate at the time of heat treatment are not particularly limited so long as in the ranges where heat treatment can be sufficiently performed. For example, the temperature elevation rate may be 3° C./min or more, 5° C./min or more, 10° C./min or more, or 15° C./min or more and may be 30° C./min or less, 20° C./min or less, or 15° C./min or less. The cooling rate may be 10° C./min or more, 20° C./min or more, 30° C./min or more, or 50° C./min or more and may be 80° C./min or less, 50° C./min or less, or 30° C./min or less.

The atmosphere at the time of heat treatment is preferably an inert atmosphere or a reducing atmosphere so that the carbonaceous material does not oxidize.

Acid Treatment Step

The method of production of the electrode catalyst for fuel cell of the present invention can further comprise an acid treatment step.

In the acid treatment step, the PtCo alloy supported by the solid carbon carrier is preferably treated by acid at 70 to 90° C., more preferably 75 to 85° C. By acid treatment at such a temperature, it is possible to sufficiently remove the Co not contributing to the reaction. Due to this, it is possible to suppress elution of Co.

As the acid used in the acid treatment step, for example, inorganic acids (nitric acid, phosphoric acid, permanganic acid, sulfuric acid, hydrochloric acid, etc.), organic acids (acetic acid, malonic acid, oxalic acid, formic acid, citric acid, lactic acid, etc.) may be mentioned.

The present invention will be explained more specifically by the following examples, but the present invention is not limited by these.

EXAMPLES

Example of Production

Example 1

7 g of dendritic carbon with a BET specific surface area of about 1000 $m^2/g$ was made to disperse in 1 liter of a 0.1N nitric acid aqueous solution. To this dispersion, a solution of diammine dinitro platinum nitric acid containing 2.8 g of platinum is added to give a platinum support rate of 40 wt %. As a reducing agent, 27 g of 99.5% ethanol was further added and sufficiently mixed in. Further, using the ethanol as a reducing agent, the metal was supported by reduction. The dispersion after reduction was repeatedly filtered and washed until the conductivity of the waste liquor of the filtrate became 50 μS/cm or less. The powder cake obtained by filtration and washing was dried by air blow drying at 80° C. for 15 hours or more to obtain platinum-supporting carbon.

The platinum-supporting carbon was dispersed in pure water of 80 times the amount of carbon and the cobalt nitrate solution was added dropwise. This cobalt nitrate aqueous solution is prepared by making the commercially available cobalt nitrate 6 hydrate dissolve in pure water and was used to give a molar ratio of platinum:cobalt of 7:1. The cobalt nitrate aqueous solution was charged, then further sodium borohydride dissolved in pure water was used as a reducing agent for supporting the metal by reduction. This dispersion was repeatedly filtered and washed until the conductivity of the waste liquor of the filtrate became 5 μS/cm or less. The powder cake obtained by filtration and washing was dried by air blow drying at 80° C. for 15 hours or more to obtain platinum alloy-supporting carbon.

The platinum alloy-supporting carbon obtained in this way was raised in temperature in an argon atmosphere by 10° C./min for heat treatment. The temperature elevation was stopped when reaching 950° C. After stopping the temperature elevation, the temperature was lowered to about 750° C. within several minutes. Finally the carbon was cooled down to near room temperature. Due to this, the electrode catalyst for fuel cell of Example 1 was obtained. The heat treatment temperature and elapsed time in Example 1 are shown in FIG. 1.

Example 2

Except for changing the heat treatment to raise the temperature by 10° C./min and, when reaching 900° C., holding at that temperature for 1 hour, the same procedure was followed as in Example 1 to obtain an electrode catalyst for fuel cell of Example 2. The heat treatment temperature and elapsed time in Example 2 are shown in FIG. 1.

Example 3

Except for changing the heat treatment to raise the temperature by 10° C./min and after reaching 850° C., holding at that temperature for 1.5 hours and for using as the carrier particles solid carbon with a BET specific surface area of about 800 $m^2/g$, the same procedure was followed as in Example 1 to obtain an electrode catalyst for fuel cell of Example 3. The heat treatment temperature and elapsed time in Example 3 are shown in FIG. 1.

Comparative Example 1

Except for changing the heat treatment to heat at 800° C. for 4 hours, the same procedure was followed as in Example 1 to obtain an electrode catalyst for fuel cell of Comparative Example 1.

Comparative Example 2

Except for not performing the heat treatment, the same procedure was followed as in Example 1 to obtain an electrode catalyst for fuel cell of Comparative Example 2.

Comparative Example 3

Except for using as the carrier particles solid carbon with a BET specific surface area of about 600 $m^2/g$, the same procedure was followed as in Example 1 to obtain an electrode catalyst for fuel cell of Comparative Example 3.

Evaluation

Measurement of Particle Size

The average particle size of the catalyst metal particles prepared was calculated from the measurement peak of the X-ray diffraction using the analytical software JADE. Further, the standard deviation of the particle size of the catalyst metal particles was calculated from the measurement peak of X-ray small angle scattering using the analytical software Nano-Solver.

Initial Catalytic Activity

The electrode catalyst produced by each of the examples and comparative examples was dispersed in an organic solvent. The dispersion was coated on a Teflon® sheet to form electrodes. The electrodes were hot pressed together through a polymer electrolyte membrane and diffusion layers were arranged at the two sides to prepare a unit cell for use for a solid polymer type fuel cell.

The cell temperature was made 80° C., the relative humidity of the two electrodes was made 100%, and a small unit cell evaluation system (made by Toyo) was used for cyclic voltammetry (CV) and IV measurement.

For IV measurement, the current was freely controlled in the range of 0.01 to 1.0 A/$cm^2$. The current value per mass of Pt at the time of 0.86V was defined as the "initial catalytic activity".

Rate of Maintenance of Activity

The cell of the fuel cell tested for initial catalytic activity was repeatedly charged and discharged 2000 times, then again measured for IV. The ratio (%) of the current value after the charging and discharging test with respect to the current value of the initial catalytic activity was calculated. That value was defined as the "rate of maintenance of activity".

Results

The results are shown in the following table.

TABLE 1

| | BET specific surface area ($m^2/g$) | Average particle size (nm) | Standard deviation (nm) | Initial catalytic activity (A/g@ 0.86 V) | Rate of maintaining activity (%) |
|---|---|---|---|---|---|
| Ex. 1 | 1000 | 3.0 | 1.0 | 0.46 | 67 |
| Ex. 2 | 1000 | 3.5 | 1.1 | 0.46 | 72 |
| Ex. 3 | 800 | 3.7 | 1.2 | 0.37 | 68 |
| Comp. Ex. 1 | 1000 | 3.8 | 1.4 | 0.47 | 56 |
| Comp. Ex. 2 | 1000 | 2.2 | 0.9 | 0.35 | 57 |
| Comp. Ex. 3 | 600 | 5.1 | 1.3 | 0.19 | 63 |

Each of Examples 1 to 3 had a relatively small particle size of the catalyst metal particles, so the initial catalytic activity was high. If the particle size of the catalyst metal particles is small, a drop in the rate of maintenance of activity is feared, but unexpectedly, the rate of maintenance of activity was high. While not theoretically constrained, this is believed to have been due to the uniform particle size of the catalyst metal particles.

Comparative Example 1 had an average particle size of catalyst metal particles in the preferable range and had a sufficient initial catalytic activity, but was large in standard deviation and was not uniform in the particle size of the catalyst metal particles. As a result, the rate of maintenance of activity became low. Comparative Example 2 had a small average particle size of catalyst metal particles, so the initial catalytic activity was sufficient, but since the average particle size was too small, even if the particle size of the catalyst metal particles was uniform, the rate of maintenance of activity fell. Comparative Example 3 had a large average particle size of the catalyst metal particles, so the rate of maintenance of activity was high, but the initial catalytic activity became low.

The invention claimed is:

1. A method of producing an electrode catalyst comprising catalyst metal particles containing platinum or a platinum alloy, and carrier particles supporting the catalyst metal particles, the method comprising:
    bringing a platinate solution into contact with the carrier particles;
    using alcohol as a reducing agent to reduce the platinate at 60° C. to 90° C. for 1 hour to 3 hours, to support metal forming the catalyst metal particles on the carrier particles; and
    heat treating the carrier particles supporting the metal forming the catalyst metal particles at a temperature of 850 to 980° C. for 0.2 hour to 2 hours thereby producing the electrode catalyst,
    wherein:
    the carrier particles are made of a carbonaceous material with a BET specific surface area of 700 to 2,500 $m^2/g$,
    the catalyst metal particles have an average particle size of 2.8 to 3.7 nm, and
    a standard deviation of the particle size of the catalyst metal particles is 0.5 to 1.2 nm.

2. The method according to claim 1, wherein the alcohol is ethanol.

3. The method according to claim 1, the platinate solution is a solution of diammine dinitro platinum nitric acid.

4. The method according to claim 1, wherein the carrier particles are made of a carbonaceous material with a BET specific surface area of 700 to 2,000 $m^2/g$.

* * * * *